United States Patent
Viethen (10) Patent No.: US 10,220,703 B2
(45) Date of Patent: Mar. 5, 2019

(54) ACCELERATOR PEDAL UNIT FOR A VEHICLE

(71) Applicant: HELLA GmbH & Co. KGaA, Lippstadt (DE)

(72) Inventor: Claus Viethen, Erwitte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 15/847,068

(22) Filed: Dec. 19, 2017

(65) Prior Publication Data
US 2018/0105038 A1 Apr. 19, 2018

Related U.S. Application Data (63) Continuation of application No. PCT/EP2016/062397, filed on Jun. 1, 2016.

(30) Foreign Application Priority Data

Jun. 19, 2015 (DE) .................. 10 2015 109 810

(51) Int. Cl.
| | | |
|---|---|---|
| B60K 26/02 | (2006.01) | |
| G05G 1/30 | (2008.04) | |
| G05G 1/38 | (2008.04) | |

(52) U.S. Cl.
CPC ............. B60K 26/021 (2013.01); G05G 1/38 (2013.01)

(58) Field of Classification Search
CPC .. G05G 1/30; G05G 1/38; G05G 1/40; G05G 1/44; G05G 1/445; G05G 5/03;
(Continued)

(56) References Cited

U.S. PATENT DOCUMENTS

| | | |
|---|---|---|
| 4,510,906 A | 4/1985 | Klatt |
| 6,474,191 B1 | 11/2002 | Campbell |

(Continued)

FOREIGN PATENT DOCUMENTS

| | | |
|---|---|---|
| DE | 32 34 479 A1 | 3/1984 |
| DE | 195 21 821 C1 | 12/1996 |

(Continued)

OTHER PUBLICATIONS

International Search Report for Internation Application No. PCT/EP2016/062397 dated Aug. 4, 2016.

*Primary Examiner* — Adam D Rogers
(74) *Attorney, Agent, or Firm* — Muncy, Geissler, Olds & Lowe, P.C.

(57) ABSTRACT

An accelerator pedal unit for a motor vehicle, having a base body on which an accelerator pedal is accommodated rotatably mounted in a rotary joint and which, starting from a resting position, can be moved by actuation in an actuating direction. A sensor unit is accommodated in the base body, which senses the position of the accelerator pedal via a feeler element. A return spring is provided, with which the accelerator pedal is prestressed into the initial position. A moveable counter-stop element can be moved into a stop position in which, when the accelerator pedal is actuated, the stop element comes into contact with the counter-stop element and runs into the sprung unit when an additional force is applied to the accelerator pedal and can be moved into a release position in which, when the accelerator pedal is actuated, the stop element can move freely in a movement region.

10 Claims, 5 Drawing Sheets

(58) Field of Classification Search
CPC ........ G05G 5/05; B60K 26/02; B60K 26/021; B60K 2026/022; B60K 2026/023
See application file for complete search history.

(56) References Cited

U.S. PATENT DOCUMENTS

| | | | | |
|---|---|---|---|---|
| 7,717,012 B2* | 5/2010 | Kim | ....................... | B60K 26/02 74/512 |
| 7,770,491 B2* | 8/2010 | Ritter | ................... | B60K 26/021 74/560 |
| 8,521,360 B2* | 8/2013 | Yamazaki | ............ | B60K 26/021 701/36 |
| 8,914,210 B2* | 12/2014 | Schmitt | ................ | B60K 26/021 701/51 |
| 9,501,083 B2* | 11/2016 | Zhou | ....................... | F02D 11/02 |
| 2013/0047776 A1 | 2/2013 | Leone et al. | | |

FOREIGN PATENT DOCUMENTS

| | | | | |
|---|---|---|---|---|
| DE | 699 23 320 T2 | 4/2006 | | |
| DE | 10 2008 054 625 A1 | 6/2010 | | |
| DE | 102014226851 A1 * | 6/2016 | ............. | B60K 23/02 |
| EP | 1 327 926 A1 | 7/2003 | | |
| WO | WO2010/046402 A1 | 4/2010 | | |
| WO | WO 2011/141459 A1 | 11/2011 | | |

\* cited by examiner

ACCELERATOR PEDAL UNIT FOR A VEHICLE

This nonprovisional application is a continuation of International Application No. PCT/EP2016/062397, which was filed on Jun. 1, 2016, and which claims priority to German Patent Application No. 10 2015 109 810.5, which was filed in Germany on Jun. 19, 2015, and which are both herein incorporated by reference.

BACKGROUND OF THE INVENTION

Field of the Invention

The present invention relates to an accelerator pedal unit for a motor vehicle having a base body on which an accelerator pedal is received rotatably mounted in a rotary joint and which, starting from a resting position, can be moved by actuating in an actuating direction, wherein a sensor unit is received in the base body, which senses the position of the accelerator pedal via a feeler element, and wherein a return spring is provided, with which the accelerator pedal is prestressed into the starting position.

Description of the Background Art

WO 2011/141459 A1, which corresponds to US 2013/0047776, describes a generic accelerator pedal unit for a motor vehicle having a base body on which an accelerator pedal is received rotatably mounted in a rotary joint. The accelerator pedal is prestressed into a starting position by a return spring, and when a driver of the motor vehicle operates the accelerator pedal, then in addition to the actuating force that is generated by the return spring, which substantially linearly increases with the movement of the accelerator pedal in the actuating direction, a further actuating force can be added, which is adjustable with respect to the force value and with respect to the point of onset of the additional force via the path in the actuating direction of the accelerator pedal.

The design of the accelerator pedal unit is complicated and a lifting magnet is provided which has to press the magnetic plunger, when activated, against a contact surface. However, in order to permanently maintain contact between the magnetic plunger and the contact surface, an additional spring element is necessary. The contact surface is thereby formed on a cam-like cam disk. When the lifting magnet is energized and when the plunger pushes against the contact surface, the resulting total operating force of the accelerator pedal is characterized by a surge in force, subject to the current supply and the point of activation of the lifting magnet.

Such a surge in force, for example, can be used in hybrid vehicles, to provide the driver of the vehicle with information when a surge in force occurs between an electrical drive and an internal combustion engine operation. In this case, vibrations or certain pulse sequences are disclosed as force information that is applied to the accelerator pedal and which can be generated via a corresponding activation of the lifting magnet.

Other disadvantages seen in known accelerator pedal units aside from the complex structure are that long actuating paths are required for the application of an additional surge in force, and for the plunger, which can be moved with the lifting magnet, a position detection along an axis of movement needs to be provided, thereby additionally increasing the complexity of the design of the accelerator pedal unit.

SUMMARY OF THE INVENTION

It is therefore an object of the invention to provide an accelerator pedal unit for a vehicle with a simple structure, with which an additional force for actuating the accelerator pedal can be generated. In particular, it is an object of the invention to be able to switch the production of the additional force on and off with the simplest means possible.

In an exemplary embodiment, a sprung unit is provided with a stop element under spring prestress and is disposed on the accelerator pedal, and a movable counter-stop element is provided, wherein the counter-stop element is movable in a stop position, in which with an actuation of the accelerator pedal, the stop element comes to rest against the counter-stop element and retracts into the sprung unit by applying an additional force, and wherein the counter-stop element is movable into a release position in which the stop element can be moved freely within a movement region by an actuation of the accelerator pedal.

An exemplary embodiment provides that a surge in force can be switched on and off when an accelerator pedal is actuated, in that a counter-stop element is moved in a simple manner between a stop position and a release position. When the additional return force of the accelerator pedal is switched on, the counter-stop element is moved to the stop position, when the additional return force is switched back off, the accelerator pedal unit according to the invention enables the counter-stop element to move into a release position.

A particular advantage is that the feed force for the attack is independent of the magnitude of the surge in force, a fact which is achieved by an independent delivery relative to the vertically extending plunger movement. This way, the same actuator can be used for different haptic signals and accelerator pedal embodiments with low actuating forces.

With the exception of an electrical movement unit for generating the movement of the stop element, a purely mechanical interpretation of the switching on and off of the additional return force can be provided. The stop element is moved along its movement region to the actuation of the accelerator pedal in that the accelerator pedal is moved in the actuating direction, for example, in the direction toward the base body via the connection with the rotary joint. By means of the spring-loaded characteristic of the stop element and the arrangement of the sprung unit on the accelerator pedal, the additional return force is mechanically switched to the return force, which is already provided by the return spring in a known manner. An electrical switching of the sprung unit is not required since the counter-stop element can be retracted into the movement region in a simple mechanical manner, and also moved back out again. When the counter-stop element is in the release position, the sprung unit remains in a resting configuration with the spring loaded stop element, and only when the counter-stop element is moved into the movement range of the stop element, the stop element is activated by the spring-loaded configuration in or on the sprung unit, generating the additional return force.

Advantageously, the counter-stop element is movably received in the base body. When the accelerator pedal is activated and moved in the actuating direction against the base body via the rotary joint, the sprung unit can at least partially enter into a corresponding opening in the base body. By retracting the sprung unit, the spring loaded stop element also enters in the base body and can interact with the counter-stop element in the stop position.

An arrangement of the sprung unit in the base body is also provided in an embodiment, and at the same time, the counter-stop element can be arranged to be movable on the accelerator pedal. The mode of operation and thus the basic idea of the invention are thereby fulfilled in the same way.

According to an embodiment of the invention, an actuator is provided with which the counter-stop element can be moved between the stop position and the release position. For example, the actuator comprises a lifting magnet arrangement by which the movement of the stop element can be generated. The lifting magnet arrangement can be made very simple, because the counter-stop element only has to switch between the stop position and the release position. For this purpose, the lifting magnet arrangement must only be electrically switched on and off, and it is conceivable that the lifting magnet arrangement has a bistable version so that the counter-stop element occupies a stable arrangement either in the stop position or in the release position without energizing. Of course, there is also the possibility of a monostable version of the lifting magnet arrangement, for example, in the release position.

The actuator can include a spring unit which is disposed between the counter-stop element and the lifting magnet arrangement. By means of the spring unit, a compliance is installed in the connection between the counter-stop element and the lifting magnet arrangement, which will serve in particular to avoid jamming between the stop element and the counter-stop element. For example, a state in which the counter-stop element is disposed in the release position can occur, and by activating the actuator, the counter-stop element is transferred to the stop position, while the stop element has already been moved into the movement region. Without the arrangement of the spring unit, such an unintended collision between the stop element and the counter-stop element could possibly lead to a deadlock between the stop element and the counter-stop element. Similarly, the spring unit prevents the stop element from striking against the counter-stop element, and by activating the actuator, the counter-stop element is transferred to the release position. Also in this case, a negative interplay between the stop element and the counter-stop element must be avoided, which is the purpose of the compliance characteristics of the spring unit.

For example, the stop element is formed by a plunger, which is movable in its longitudinal direction. The plunger may come to rest against the counter-stop element with its end face when the latter is in the stop position and when the plunger is moved into the movement range by actuating the accelerator pedal. The stop element can, however, alternatively be designed in the form of a lever, a rocker, a rotary element or the like.

In accordance with an embodiment of the invention, the sprung unit includes a housing, in or on which the stop element is received movably guided. The accelerator pedal has an actuating side via which the driver usually activates the accelerator pedal with his foot in the direction of actuation. The sprung unit is arranged on the side opposite the actuating side of the accelerator pedal, thus the rear side, wherein the housing of the sprung unit can also be designed in one piece and in particular integrally with the accelerator pedal.

The sprung unit can comprise a spring element, with which the stop element is prestressed. The spring element and a portion of the stop element, in particular a part of the plunger, can be added to further advantage to the housing of the sprung unit. In this way, the plunger can project over a partial length from the housing of the sprung unit, and if the end face of the plunger enters into contact with the counter-stop element, the plunger is pushed along its longitudinal direction into the housing of the stop element under compression of the spring element.

The feeler element can access the position of the accelerator pedal in order to sense said position. According to an embodiment that further simplifies the construction of the accelerator pedal unit, the feeler element can interact with the housing of the sprung unit. This way, in particular, a transmission element between the accelerator pedal and the sensor unit is replaced with the feeler element by the inventive sprung unit being used for this purpose.

According to an embodiment, the sprung unit includes an actuator with which a defined force-displacement progression of a retraction of the stop element into the housing of the sprung unit is produced. The actuator may be designed such that for the surge in force, in addition to the ordinary actuating force of the accelerator pedal, the additional return force engages at a certain point and rises sharply. The sudden increase in the total actuating force of the accelerator pedal is already achieved by the plunger being prestressed with a resting force via the spring unit in the housing of the sprung unit. When an operator depresses the accelerator pedal and the plunger enters into contact with the counter-stop element, this high force adds to the ordinary actuating force, which is generated by the return spring. However, the actuator in the sprung unit can be further developed such that an initial surge in force again drops in the actuating direction when the accelerator is depressed further.

The activation of the actuator can be effected by the driver of the motor vehicle, for example by operating a control device in the motor vehicle, and the actuator can be formed in the motor vehicle for connection with a control unit. When the driver of the motor vehicle desires information about a position of the accelerator pedal in the actuating direction, from which, or just before which, the internal combustion engine is switched on, the actuator can be activated and the counter-stop element is transferred to the stop position. When the driver switches the actuator off again, because the driver does not want the intrusion of the additional return force, the actuator is deactivated and the counter-stop element is transferred to the release position.

In particular, it is also possible to provide a sensor which detects whether the counter-stop element is positioned in the stop position or in the release position. By detecting the position of the counter-stop element, it is possible to issue feedback to the control unit which enhances the security of the arrangement. The sensor is advantageously included in the base body.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
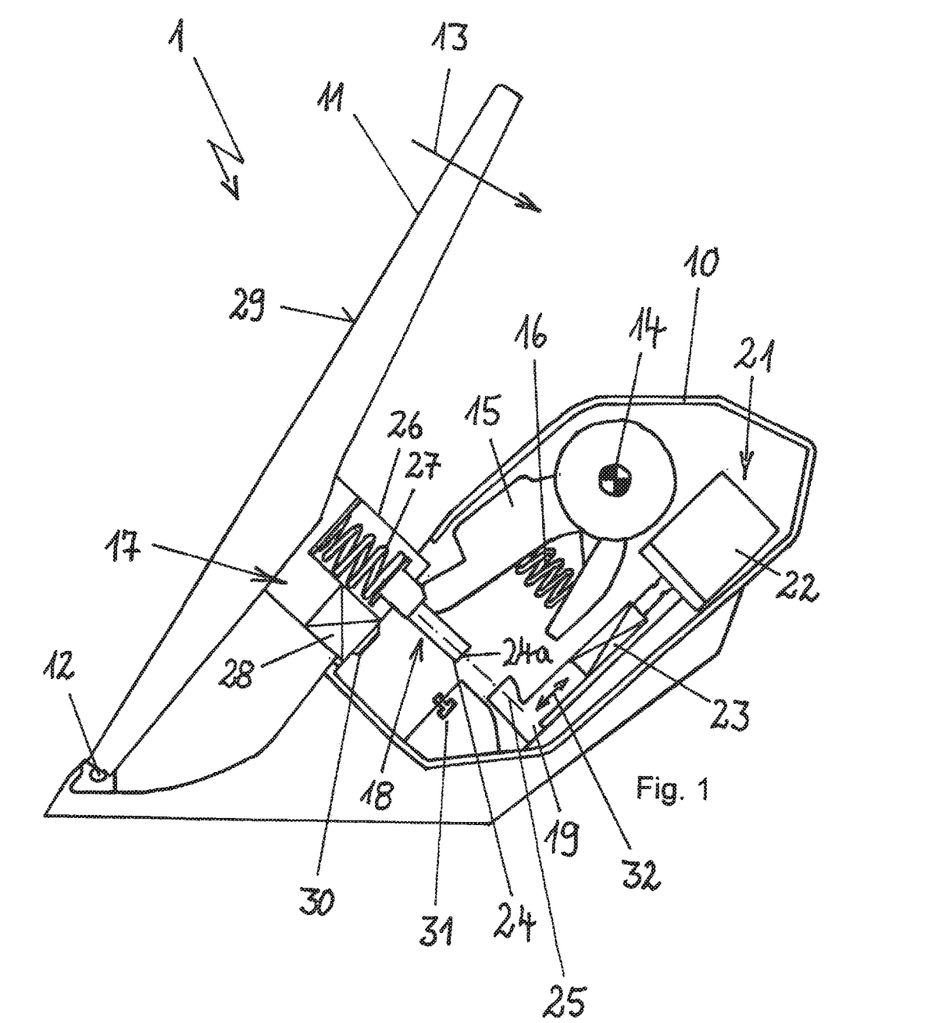
FIG. 1 is a schematic side view of an accelerator pedal unit for a motor vehicle having the features of the invention, wherein the accelerator pedal is shown in a starting position.

In a schematic side view, FIG. 1 shows the accelerator pedal unit 1 for a motor vehicle having a base body 10, on which an accelerator pedal 11 is received rotatably mounted in a rotary joint 12. When the accelerator pedal 11 is activated, it moves from the shown starting position along a direction of actuation 13, wherein the accelerator pedal 11 is moved towards the base body 10. In this case, a sensor unit 14 is activated via a feeler element 15, which is designed lever-like, in a manner not further shown, and via the sensor unit 14, the position of the accelerator pedal can be sensed along the direction of actuation 13. This way, an accelerator pedal signal is provided to a control unit via which, in a manner generally known, the driving speed of the motor vehicle can be specified.

A return spring 16 is shown in order to prestress the accelerator pedal 11 in the direction of a starting position, which the accelerator pedal 11 occupies when no actuation of the accelerator pedal 11 occurs. The return spring 16 generates a pedal normal force that is experienced by a driver of the motor vehicle in a known manner, wherein the pedal normal force causes a return force of the accelerator pedal 11 against the movement in the actuating direction 13.

The accelerator pedal unit 1 has a sprung unit 17 arranged on the accelerator pedal 11. The sprung unit 17 is disposed on the rear of the accelerator pedal 11 so that the sprung unit 17 is positioned on a side opposite the actuating side 29 of the accelerator pedal 11. The sprung unit 17 includes a housing 26, and the housing 26 accommodates a stop element 18, and the stop element 18 is designed as a plunger 24 which mostly projects from the housing 26 in a longitudinal direction 25.

In the housing 26 of the sprung unit 17, a spring element 27 is received which prestresses the plunger 24 in its longitudinal direction 25 so that the plunger 24 is pressed out of the housing 26 up to an endpoint.

Also located on the housing 26 is an end stop 30, which comes to rest at a rubber element 31 on the base body 10 when the accelerator pedal 11 has been activated into a full load setting.

The base body 10 accommodates a counter-stop element 19, and the counter-stop element 19 can be reciprocated between a stop position (see FIG. 2) and a release position (see FIG. 3) via an actuator 21, which is designed as a lifting magnet arrangement 22. The direction of movement 32 between the stop position and the release position is indicated with a double arrow, and it can be seen that the movement direction 32 runs perpendicular to the longitudinal direction 25 of the plunger 24.

The actuator 21 comprises a spring unit 23 which is arranged between the counter-stop element 19 and the lifting magnet arrangement 22. By means of the spring unit 23, in the connection between the counter-stop element 19 and the lifting magnet arrangement 22, a compliance is generated which serves in particular to avoid jamming between the stop element 18 and the counter-stop element 19.

Figures 2, 3:
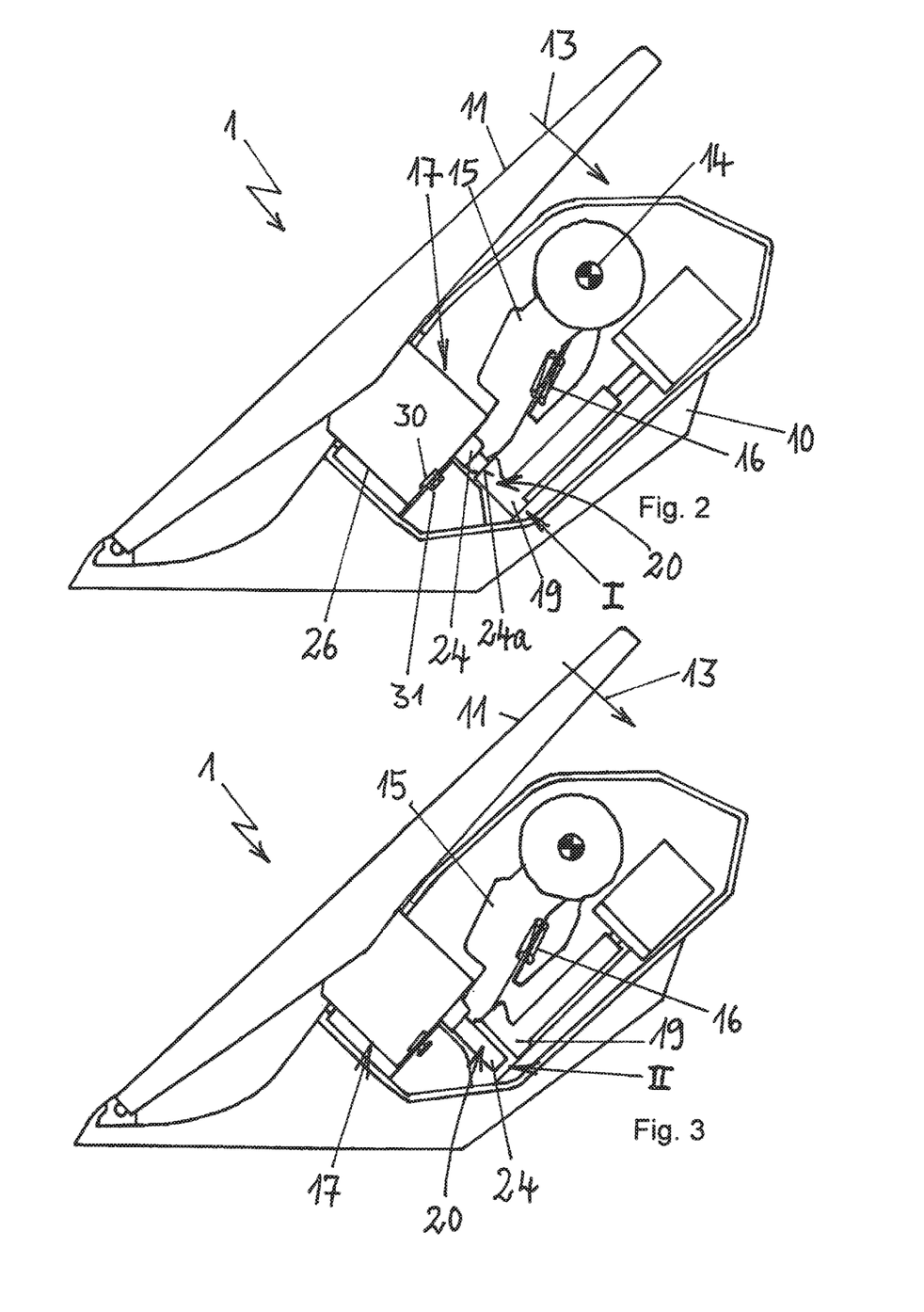
FIG. 2 is the view of the accelerator pedal unit with a sprung unit and a counter-stop element, wherein the counter-stop element is arranged in a stop position and interacts with the sprung unit.
FIG. 3 is the view according to FIG. 2, wherein the counter-stop element is arranged in a release position and does not interact with the sprung unit.

FIG. 2 shows the accelerator pedal unit 1 with the sprung unit 17 and the counter-stop element 19, which is shown in a stop position I. The accelerator pedal 11 is fully depressed in the position shown and the sprung unit 17 immerses with the plunger 24 into the base body 10. Due to the arrangement of the counter-stop element 19 in the movement range 20 of the plunger 24, the end face 24a of the plunger 24 comes to rest against the counter-stop element 19 and, with further activation of the accelerator pedal 11 in the actuating direction 13, is pressed into the housing 26 of the sprung unit 17. By means of the compression of the spring element 27 (see FIG. 1), the spring force of the spring element 27 is added to the spring force of the return spring 16 so that the driver perceives a surge in force when depressing the accelerator pedal 11. The beginning of the surge in force takes place the moment in which the end face 24a of the plunger 16 comes to rest against the counter-stop element 19. Since the plunger 24 is prestressed in the housing 26 of the sprung unit 17, a spontaneous increase in the actuating force of the accelerator pedal 11 occurs, because an additional return force is added to the return force that is generated by the return spring 16.

The feeler element 15 is designed such that it rests with an end face against the front of the housing 26 of the sprung unit 17. This way, the feeler element 15 is activated so that at the same time, the accelerator pedal position can be sensed via the sensor unit 14. The full load setting shown is obtained by the end stop 30 coming to rest against the rubber element 31. This means that another depression of the accelerator pedal 11 in the actuating direction 13 is not possible.

FIG. 3 shows the accelerator pedal unit 1 according to FIG. 2 with the counter-stop element 19, which is in a release position II. As a result, the counter-stop element 19 is not in the movement region 20 of the plunger 24, and the plunger 24 remains in a position extended out of the housing 26 of the sprung unit 17. Consequently, no additional return force counter to the actuating direction 13 is added to the return force of the accelerator pedal 11 which is generated by the return spring 16 in a known manner.

Figure 4:
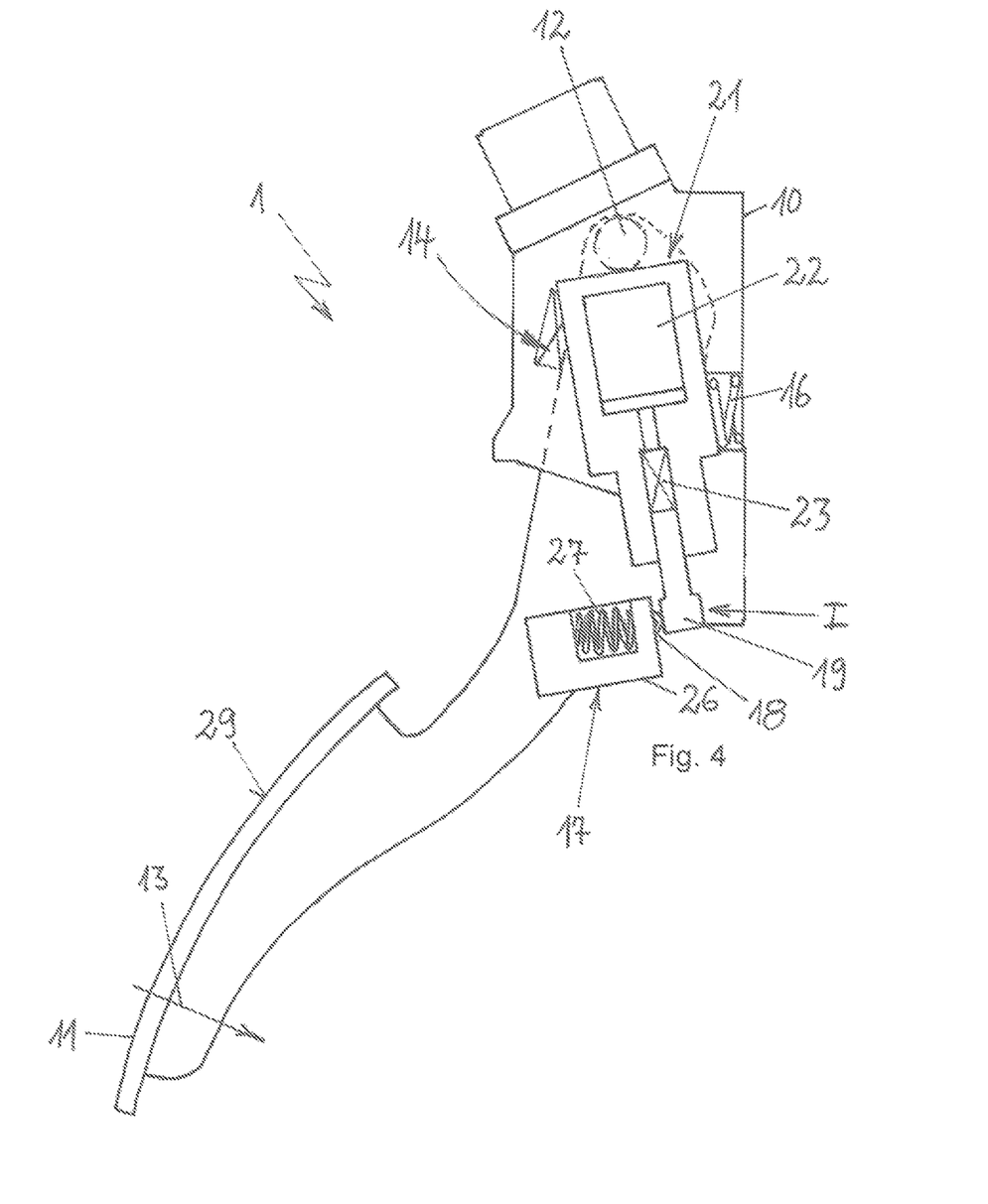
FIG. 4 illustrates an embodiment of the accelerator pedal unit with a suspended arrangement of the accelerator pedal, wherein the counter-stop element is shown moved forward into the stop position.
Figure 5:
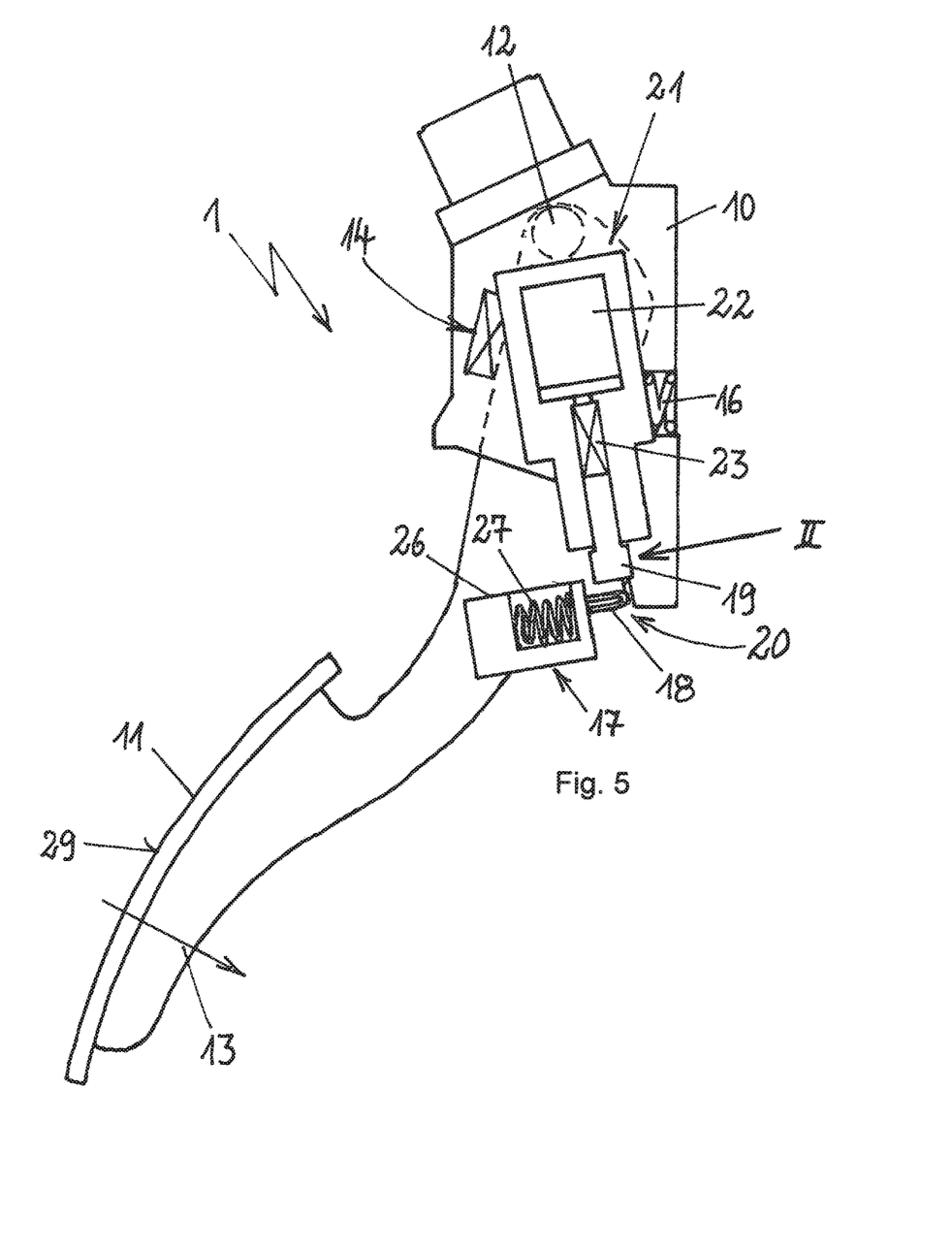
FIG. 5 illustrates the embodiment of the accelerator pedal unit in accordance with FIG. 4, wherein the counter-stop element is shown retracted into the release position.

FIGS. 4 and 5 show another embodiment of the accelerator pedal unit 1 for a motor vehicle having a base body 10, on which an accelerator pedal 11 is mounted rotatably suspended in a rotary joint 12. When the accelerator pedal 11 is activated, it moves from a starting position along a direction of actuation 13 into the full load setting shown, wherein the accelerator pedal 11 is pivoted under the base body 10 due to the suspended arrangement. In this case, a sensor unit 14 is activated in a manner not further shown and the position of the accelerator pedal 11 along the actuating direction 13 can be sensed via the sensor unit 14.

A return spring 16 is shown in order to prestress the accelerator pedal 11 in the direction of a starting position, which the accelerator pedal 11 then occupies when no actuation of the accelerator pedal 11 takes place. The return spring 16 generates a pedal normal force experienced by a driver of the motor vehicle in a known manner, wherein the pedal normal force causes a return force of the accelerator pedal 11 against the movement in the actuating direction 13.

The accelerator pedal unit 1 has a sprung unit 17 arranged at the accelerator pedal 11. The sprung unit 17 is disposed on the accelerator pedal 11 on the rear or top side from the actuating side 29, said unit including a housing 26 in which a stop element 18 is received, which is prestressed with a spring element 27 in a manner projecting from the housing 26.

A counter-stop element 19 is movably received in the base body 10, and the counter-stop element 19 can be moved back and forth via the actuator 21, which is designed as a lifting magnet arrangement 22, between a stop position I, shown in FIG. 4, and a release position II, shown in FIG. 5.

The actuator 21 comprises a spring unit 23 which is arranged between the counter-stop element 19 and the lifting magnet arrangement 22. By means of the spring unit 23, a compliance is generated in the connection between the counter-stop element 19 and the lifting magnet arrangement 22 which serves in particular to avoid jamming between the stop element 18 and the counter-stop element 19.

In FIG. 4, the counter-stop element 19 is in the shown stop position, and with an actuated accelerator pedal 11, the stop element 18 comes to rest against the counter-stop element 19.

In FIG. 5, the counter-stop element 19 is in the release position II, and with an actuated accelerator pedal 11, the stop element 18 does not come to rest against the counter-stop element 19 as this is guided out of the movement range 20.

Figure 6:
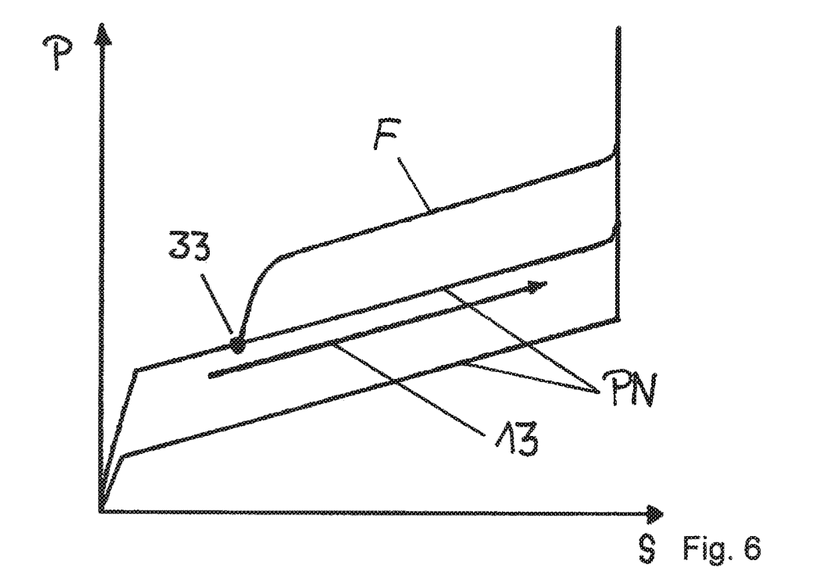
FIG. 6 is a diagram in which the pedal force is applied along the pedal path in the actuating direction, and wherein a surge in force is added to the actuating force

FIG. 6 shows a diagram with which a pedal force P is applied via a pedal path s. The shown pedal normal force PN has a substantially linear course, wherein a parallel course for a path in the direction of actuation 13 and against the direction of actuation 13 arises hysteresis-like.

In an illustrated switch-on point 33, the additional return force F is added to the pedal normal force PN so that a sudden increase in pedal force can be detected by the driver of the motor vehicle.

Figure 7:
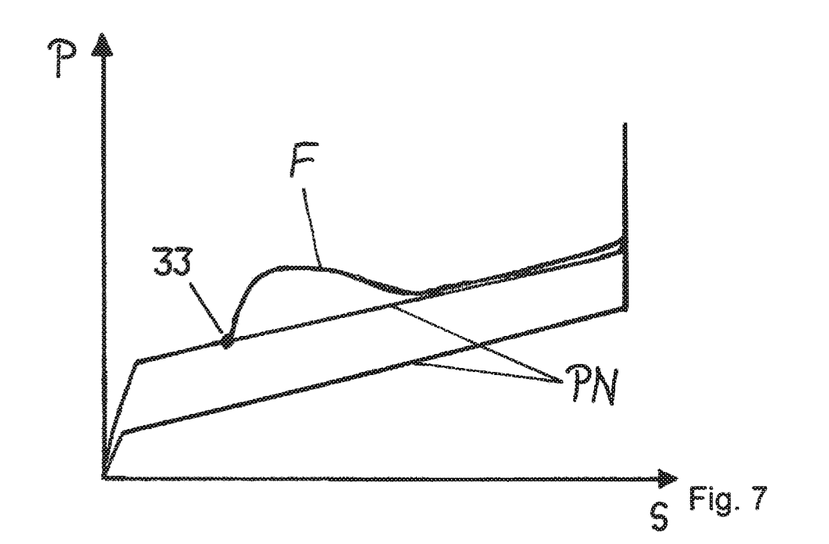
FIG. 7 is a diagram in which the pedal force is applied along the pedal path in the actuating direction, and wherein a force threshold is added to the actuating force.

Finally, FIG. 7 shows a diagram with the pedal force P along the pedal path s, wherein the additional return force F is shown as a force threshold which dramatically increases starting at the switch-on point 33 and then gradually decreases with the increasing pedal path after the onset of the point of force. Such a course of the additional return force F is obtained by an actuator 28 which may be present in the sprung unit 17. The pedal normal force PN shown has, as already described in connection with FIG. 4, a substantially linear course, wherein a parallel course arises hysteresis-like for a path in the direction of actuation 13 and against the direction of actuation 13.

What is claimed is:

1. An accelerator pedal unit for a motor vehicle, the accelerator pedal unit comprising:
 a base body on which an accelerator pedal is received rotatably mounted in a rotary joint and which, starting from a resting position, is movable by actuating in an actuation direction;
 a sensor unit arranged in the base body to sense a position of the accelerator pedal via a feeler element;
 a return spring with which the accelerator pedal is prestressed in a starting position;
 a sprung unit arranged on the accelerator pedal with a spring loaded stop element; and
 a movable counter-stop element,
 wherein the movable counter-stop element is movable to a stop position, in which upon actuation of the accelerator pedal, the spring loaded stop element comes to rest against the movable counter-stop element, and which enters in the sprung unit upon application of an additional force, and
 wherein the movable counter-stop element is movable to a release position in which upon actuation of the accelerator pedal, the spring loaded stop element is freely movable in a movement region.

2. The accelerator pedal unit according to claim 1, wherein the movable counter-stop element is movably received in the base body.

3. The accelerator pedal unit according to claim 1, wherein an actuator is provided with which the movable counter-stop element is movable between the stop position and the release position.

4. The accelerator pedal unit according to claim 3, wherein the actuator comprises a lifting magnet arrangement with which the movement of the movable counter-stop element can be generated.

5. The accelerator pedal unit according to claim 4, wherein the actuator comprises a spring unit which is disposed between the movable counter-stop element and the lifting magnet arrangement.

6. The accelerator pedal unit according to claim 1, wherein the spring loaded stop element is formed by a plunger which is movable in a longitudinal direction, wherein said plunger comes to rest with an end face against the movable counter-stop element when the movable counter-stop element is in the stop position.

7. The accelerator pedal unit according to claim 1, wherein the sprung unit comprises a housing, in or on which the spring loaded stop element is received movably guided.

8. The accelerator pedal unit according to claim 7, wherein the sprung unit comprises a spring element with which the spring loaded stop element is prestressed.

9. The accelerator pedal unit according to claim 1, wherein the feeler element interacts with a housing of the sprung unit so that the sensor unit senses the position of the accelerator pedal via interaction between the feeler element and the housing of the sprung unit.

10. The accelerator pedal unit according to claim 1, wherein the sprung unit comprises an actuator with which a defined force-displacement progression of a retraction of the spring loaded stop element into a housing of the sprung unit is generated.

* * * * *